United States Patent [19]

Emma et al.

[11] Patent Number: 5,333,283
[45] Date of Patent: Jul. 26, 1994

[54] CASE BLOCK TABLE FOR PREDICTING THE OUTCOME OF BLOCKS OF CONDITIONAL BRANCHES HAVING A COMMON OPERAND

[75] Inventors: Philip G. Emma, Danbury, Conn.; David R. Kaeli, Ramsey, N.J.

[73] Assignee: International Business Machines Corporation, Armonk, N.Y.

[21] Appl. No.: 784,335

[22] Filed: Oct. 29, 1991

[51] Int. Cl.[5] .......................... G06F 9/38; G06F 9/345
[52] U.S. Cl. .................................. 395/375; 395/700; 364/DIG. 1; 364/261.3; 364/263.1; 364/938
[58] Field of Search ................................ 395/375, 700

[56] References Cited

U.S. PATENT DOCUMENTS

| | | | |
|---|---|---|---|
| 3,559,183 | 1/1971 | Sussenzuth | 395/375 |
| 4,477,872 | 10/1984 | Losq et al. | 395/375 |
| 4,679,141 | 7/1987 | Pomerene et al. | 395/375 |
| 4,763,245 | 8/1988 | Emma et al. | 395/375 |
| 4,853,840 | 8/1989 | Shibuya | 395/375 |
| 4,881,170 | 11/1989 | Morisada | 395/375 |
| 4,894,772 | 1/1990 | Langendorf | 395/375 |
| 4,984,154 | 1/1991 | Hanatani et al. | 395/375 |
| 4,991,080 | 2/1991 | Emma et al. | 395/375 |
| 5,121,473 | 6/1992 | Hodges | 395/375 |
| 5,210,831 | 5/1993 | Emma et al. | 395/375 |

Primary Examiner—Parshotam S. Lall
Assistant Examiner—Krisna Lim
Attorney, Agent, or Firm—Ronald L. Drumheller; Richard M. Ludwin

[57] ABSTRACT

A method and apparatus is disclosed for folding the execution of a multi-way branch or switch based upon an operand (e.g., the block of instructions normally associated with a case statement) into a single instruction. This insulates branch prediction mechanisms from making incorrect predictions that are normally associated with a multi-way branch. A table saves the past history of multi-way branch execution. This table contains three fields: the starting address of a multi-way branch; a value of the operand used to execute that multi-way branch in the past; and the larger target address generated by that multi-way branch in the past when that particular operand value was used. In accordance with one embodiment of this invention, other branch prediction mechanisms (such as a Branch History Table or Decode History Table) are disabled from redirecting instruction fetching during execution of a multi-way branch in an instruction stream.

7 Claims, 4 Drawing Sheets

FIG. 1
PRIOR ART

```
SWITCH (OPERAND)
  {
    CASE 1:
      .
      .
      .

CASE 2:
      .
      .
      .

.
    .
    .

CASE N:
      .
      .
      .

DEFAULT:
      .
      .
      .
  }
```

FIG. 2
PRIOR ART

```
100      COMPARE CV,1
101      JUMP IF NOT EQUAL TO 200
  .
  .
  .
200      COMPARE CV,2
201      JUMP IF NOT EQUAL TO 300
  .
  .
  .
1000     COMPARE CV,N
1001     JUMP IF NOT EQUAL TO 1100
  .
  .
  .
1100     (END OF CASE BLOCK)
```

CASE BLOCK TABLE (CBT)
- 25: CASE VARIABLE
- 26: CASE BLOCK STARTING ADDRESS
- 27: TARGET ADDRESS
- 24

BEGIN_CASE (CV)
．
．
．
END_CASE (ADDR)

```
100    BEGIN_CASE (CV)
101    COMPARE   CV,1
102    JUMP IF NOT EQUAL TO 200
 .      .
 .      .
...    END_CASE (@1100)
200    COMPARE   CV,2
201    JUMP IF NOT EQUAL TO 300
 .      .
 .      .
       END_CASE (@1100)
 .      .
 .      .
1000   COMPARE   CV,N
1001   JUMP IF NOT EQUAL TO 1100
 .      .
1100   (END OF CASE BLOCK)
```

CASE BLOCK TABLE FOR PREDICTING THE OUTCOME OF BLOCKS OF CONDITIONAL BRANCHES HAVING A COMMON OPERAND

FIELD OF THE INVENTION

This invention relates generally to digital data processing apparatus and more particularly to methods and apparatus in a pipelined processor for predicting branches in an instruction stream, especially multi-way branches (sometimes called switches) that are based on the value of an operand and are implemented as a group of instructions associated with a special instruction often called a Case Statement (such group of instructions being referred to herein as a Case Block).

BACKGROUND OF THE INVENTION

In a pipelined processor, taken branches in the instruction stream cause the throughput of the pipeline to fall well below optimal. When a taken branch is encountered, a break in execution occurs. As a result, a new instruction stream must be fetched in order for the execution to continue. The memory accesses For these target instructions must be made early enough to insure that the pipeline will not stall due to a lack of instructions ready for execution.

There are two basic types of branching typically implemented in a machine instruction set: 1) unconditional branches and 2) conditional branches. Unconditional branches will always result in a break in execution. Conditional branches will sometimes result in a break, and arc dependent upon the evaluation of some condition.

There is no penalty involved when executing a not-taken conditional branch (assuming that the processor continues to prefetch down the next sequential instruction path).

Only on unconditional branches and taken conditional branches does pipeline performance suffer. Several conditional branch prediction mechanisms are know in the art. These mechanisms attempt to make a prediction at the decode phase of the processor pipeline.

A Decode History Table (DHT) attempts to correctly prefetch the target instruction stream on conditional branches, by using past execution behavior as a predictor of future behavior. A table is constructed consisting or the past history of branch behavior (taken or not taken) and the table is addressed using a transformation of the branch instruction address. A DHT is described in U.S. Pat. No. 4,477,872 by Losq. The Decode History Table is interrogated at instruction decode time, so it is called a decode-time prediction scheme.

Several mechanisms are known in the art which attempt to predict the outcome of both conditional and unconditional branches. These mechanism make a prediction at the instruction fetch phase of the pipeline.

A Branch History Table (BHT) attempts to correctly prefetch tile target instruction stream, and does so for both conditional and unconditional branches. A BHT contains the past history of branch execution and also contains the target address for each taken branch. The BHT is interrogated at instruction fetch time, the earliest possible stage in tile instruction pipeline. A BHT is described in U.S. Pat. No. 3,559,183 by Sussenguth. The BHT is addressed with the current instruction fetch address.

DHT has the major advantage over the BHT of knowing that a branch actually is contained in the instruction stream. Thus a BHT entry must contain the entire instruction address (versus a transformation) and the entire target instruction address (versus allowing the DHT to compute tile address). The BHT though has the advantage of predicting the branch action much earlier in the pipeline, thus being able to reduce pipeline stalls much more effectively.

Both tables must have associated mechanisms to allow a back out if the prediction of the branch is wrong (this is called a Branch Wrong Guess (BWG)). There are many reasons why a prediction table may make an incorrect prediction. First the DHT BWGs will be discussed, followed by tile BHT BWGs.

A DHT BWG occurs when: 1) a collision occurs on tile transformation algorithm such that multiple addresses are mapping to the same entry, and their behavior is different, 2) a branch has a changing branch behavior (i.e. a taken branch changes to not taken, then back to taken, etc.), or 3) a branch ages out of the DHT due to a finite table size. Of these causes of a BWG, changing branch behavior is the most difficult to solve.

A BWG in a BHT is caused by: 1) a changing branch behavior, 2) a changing branch target address, or 3) a branch aging out of the BHT due to the finite table effect. Of these three problems, a changing behavior contributes to the majority of the BHT BWGs.

A major cause of BWGs is due to the frequent use in high-level languages of a multi-way branch that are based on the value of an operand or variable. Multi-way branches are known by various names, such as a switch or a select instruction. Typically a specific instruction introduces a multi-way branch and that specific instruction is often called a Case Statement. Whatever the name, such multi-way branches are generally implemented in a lower level language as a block of instructions which contains a plurality of branch instructions. Such a block of instructions herein is called a Case Block. The reason why a Case Block causes problems for DHTs and BHTs is that a Case Block execution is based on the value of an operand, which herein is referred to as the Case Variable. This operand (the Case Variable) typically changes on each entry into the Case Block. This causes branches in the Case Block that were taken on their last execution to be not taken on ensuing executions, and vice-versa, thereby generating BWGs.

SUMMARY OF THE INVENTION

It is an object of this invention to avoid Branch Wrong Guesses (BWGs) by a Branch History Table (BHT) when a block of instructions (herein called a Case Block) which implements a multi-way branch (or switch) based on a single operand is executed.

Another object is to convert the execution of the block of instructions associated with a Case Statement (which is a segment of instructions which implements a multi-way branch based on an operand, such a segment herein being called a Case Block) into a single instruction execution.

A Case Block is a program segment or instruction block that is used to implement a multi-way branch or switch. It executes in part as a sequence of conditional branch instructions. In accordance with this invention, the multi-way branch of switch is implemented directly, thereby eliminating execution of the Case Block (which herein is called Case Block Folding). A Case Block is a conditional multi-way branch or switch that is based on the value of an operand (herein called the Case Variable) and it is typically associated with a special instruction which is often called a Case Statement. Since the outcome of a Case Block is that a branch condition is eventually satisfied (all Case Blocks include a fall-through condition), the eventual outcome of a Case Block is a branch to a unique address which depends upon the value of the operand (the Case Variable).

Current branch prediction mechanisms perform poorly when encountering the body of a Case Block. In accordance with this invention, a Case Block Table (CBT) is provided to relieve the branch prediction mechanism from making incorrect predictions of Case Block branches. The CBT records past history for each Case Block, trying to associate the eventual branch target with the particular value of the Case Variable. For each Case Block, there can be one unique CBT entry for each unique value for the Case Variable. A CBT entry is made up of the Case Block starting address, a value for the Case Variable, and the target address for that Case Variable value.

The CBT is accessed when the beginning of a Case Block is recognized. The table is searched for a match on the pair (Case Block starting address, Case Variable value). A valid hit causes an unconditional branch to be made to the corresponding target address. Thus, the CBT causes the entire Case Block decision structure (typically containing many conditional branches) to be bypassed (or Folded). Using this mechanism, the BWGs encountered by a BHT will be avoided and the Case Block is resolved in one instruction execution tinge. A valid hit in the CBT will disable the branch prediction mechanism from attempting to redirect the instruction pipeline.

To identify where a Case Block begins and ends, in the preferred embodiment two new instructions have been added to the instruction set: 1) BEGIN_CASE and 2) END_CASE. The BEGIN_CASE has the semantics: BEGIN_CASE(@)CV), where @CV specifies the address of the operand (the Case Variable) used to determine the outcome of the Case Block. The instruction does nothing functionally. It only serves establish the beginning of a Case Block and to identify the Case Variable or operand. This instruction will cause the Case Block to be folded in the event of a CBT hit.

The END_CASE has the semantics: END_CASE(ADDR), where ADDR specifies the final target address of the Case Block (and thus branches to the end of the Case Block). The END_CASE is treated as an unconditional branch.

BRIEF DESCRIPTION OF THE DRAWINGS

FIG. 1 provides an example of the high-level language construct herein called a Case Block.

FIG. 2 shows a compiler output of the Case Block shown in FIG. 1.

DETAILED DESCRIPTION OF THE PREFERRED EMBODIMENT

FIG. 1 provides an example of a Case Block high-level language decision structure. Specifically, a multi-way branch (switch) is based on the value of an operand (the Case Variable). Based on the value of the Case Variable, a branch is made to a specific subcase (i.e., Case 1, Case 2, ... Case N). At the end of each subcase, an unconditional branch is made to the end of the Case Block.

FIG. 2 shows one example of how a compiler might compile a Case Block. Each subcase is implemented with a compare instruction and a conditional branch. When the Case Block is entered, if the value of the Case Variable satisfies the condition in the compare instruction of the first subcase, then the conditional branch is not taken and the instructions within that first subcase are executed. Otherwise, the conditional branch is taken and leads to the compare instruction and conditional branch of the next subcase. This is repeated until the Case Variable satisfies a condition or the end of the Case Block is encountered.

Figure 3:
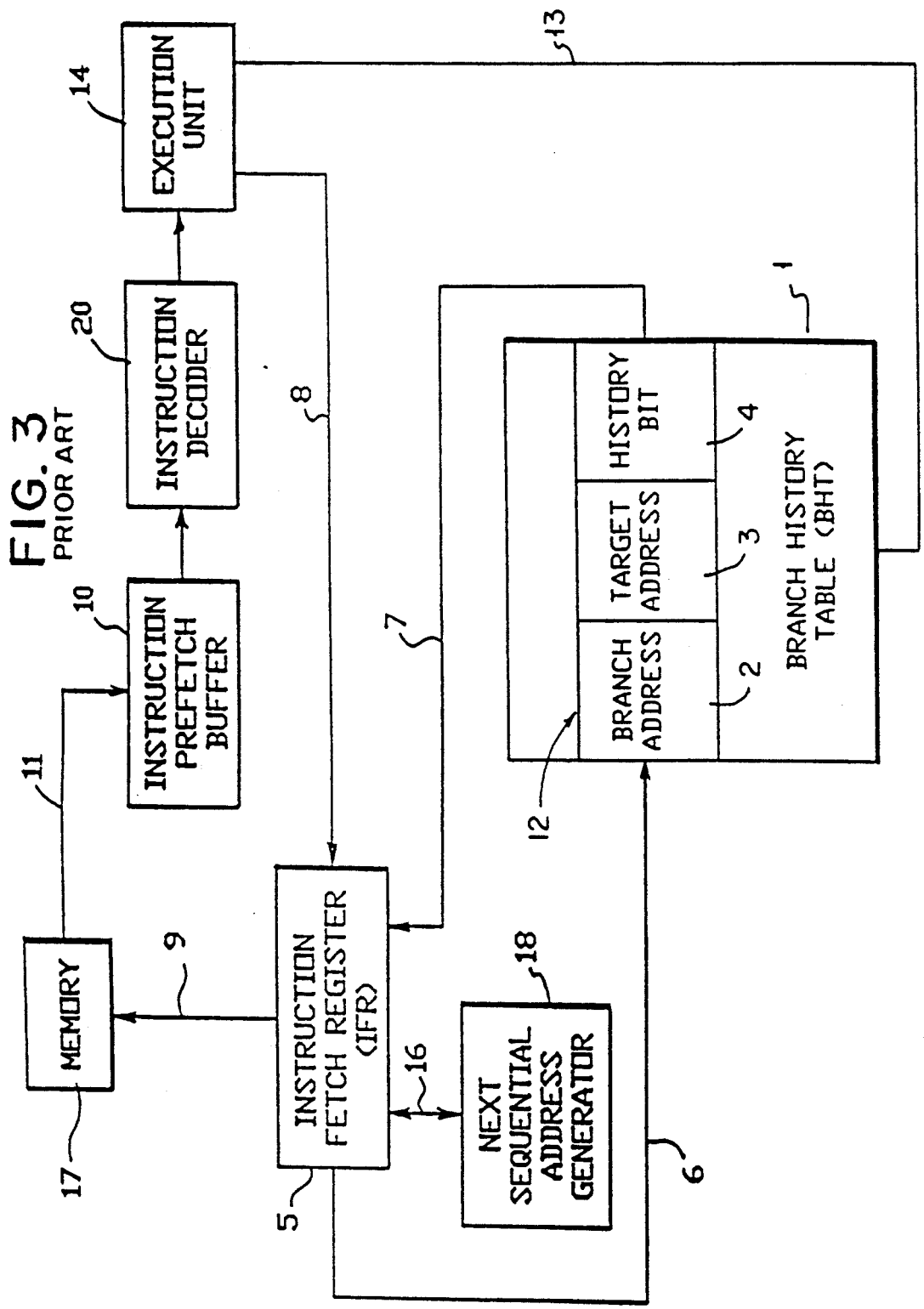
FIG. 3 is a block diagram showing how a Branch History Table works.

A different path can be taken on each entry into the Case Block. This create a highly erratic branch behavior, one that is especially difficult for a Branch History Table to predict. FIG. 3 shows one implementation of a BHT. Whenever a taken branch is executed by execution unit 14, an entry 12 is made in the BHT 1, via path 13. Entry 12 contains the branch instruction address (BA) 2, the target instruction address (TA) 3 and a history bit (H) 4. In order to determine the address of the next instruction to be fetched From memory 17 to buffer 10, a comparison is made of the BA field 2 in the BHT 1 with the address of the last instruction fetched, which is contained in the instruction fetch register (IFR) 5. If a match is found and if the history bit (H) 4 is set, then the target address (TA) 3 is transmitted to IFR 5 via path 7 to become the next address of an instruction to be prefetched. If no match is found in the BHT 1, then the next sequential address, which is generated by unit 18, is placed in IFR 5 via line 16 and the instruction at this next sequential address is directed via line 9 to be prefetched to buffer 10. If the prediction turns out to be incorrect, execution unit 14 will send the correct branch target address to the IFR 5 via path 8 to redirect prefetching. The new instruction stream is then fed to the instruction prefetch buffer 10 via path 11 for eventual decoding in unit 20 and execution in unit 14.

Using FIG. 2 as an example, when the illustrated Case Block is entered with a Case Variable value CV=2, the branch at address 101 is taken (CV not equal to 1). As a result, an entry is made in the BHT 1 with BA 2 set to 101, TA 3 set to 200 and H 4 set to 1. The compare at address 200 will then be satisfied, the branch at 201 will not be taken, the subcase for Case Variable value CV=2 will be executed, and the Case Block will be exited. On the next iteration through the Case Block, if Case Variable value CV=1, the behavior will be quite different. The BHT 1 will be interrogated via path 6 with an address of 100. A match will occur and the corresponding TA 3 with an address of 200 will be read out. The It bit 4 will be checked to see if it is set. Since it is set, the TA 3 will be transmitted along path 7 to IFR 5 to redirect instruction prefetching to the predicted target address of 200. This branch has been predicted by the BHT to be taken. Once the compare and conditional jump pass through execution unit 14, the branch condition will be resolved (CV=1) and the processor will realize that prefetching was redirected incorrectly. Then a redirection of the instruction fetch register (IFR) is made via path 8 and the H bit 4 in the BHT 1 will be reset to 0 via path 13.

If on the next invocation of the Case Block, CV=2 again, the same branch this time will be predicted to be not taken by the BHT. The address of the branch at 101 will be compared against the BA field 2 in the BHT 1. A match will occur, and the H bit 4 will be interrogated to see what the appropriate action is to be taken. Since the bit was reset on the last execution of this branch, the BHT will predict the branch to be not taken. Consequently, IFR 5 will use the next sequential address received from logic 18 to form the next prefetch address. When the compare and conditional jump pass through execution unit 14, the branch condition will be resolved (CV=2) and the processor will realize that the BHT was wrong. Then a redirection of the instruction fetch register IFR will be made via path 8 and the H bit 4 in the BHT 1 will be set back to 1 again. It is this type of erratic behavior that is typically produced by Case Blocks. This type of behavior is also quite detrimental to the performance of a BHT.

Figures 4, 5, 7:
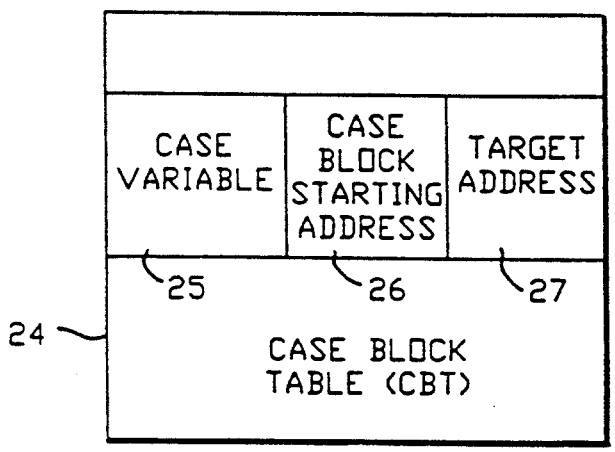
FIG. 4 shows the organization of a Case Block Table.
FIG. 5 gives the semantics of the BEGIN_CASE and END_CASE instructions.
FIG. 7 shows the output compile of the Case Block shown in FIG. 1, using the BEGIN_CASE and END_CASE instructions.

FIG. 4 shows a block diagram of a Case Block Table (CBT) 24 in accordance with this invention. The CBT table contains three fields: 1) CV, a Case Variable value or multi-way branch operand value, 2) CA, a Case Block starting instruction address, and 3) TA, the corresponding ultimate target address which was produced by a Case Block in the past which had this starting address when the Case Variable had this value. In FIG. 5, two new instructions are introduced that are used with the CBT shown in FIG. 4. BEGIN_CASE (CV) is inserted by the compiler at the beginning of each Case Block and takes CV as an argument, the Case Variable. END_CASE (ADDR) is inserted by the compiler at the end of each subcase, and is used to branch to the end of the Case Block. The END_CASE instruction takes as an argument the address of the end of the Case Block. In the event that a particular machine does not have a Case Block Table, the BEGIN_CASE is simply a non-operation (NOP) and the END_CASE acts as an unconditional branch.

Figure 6:
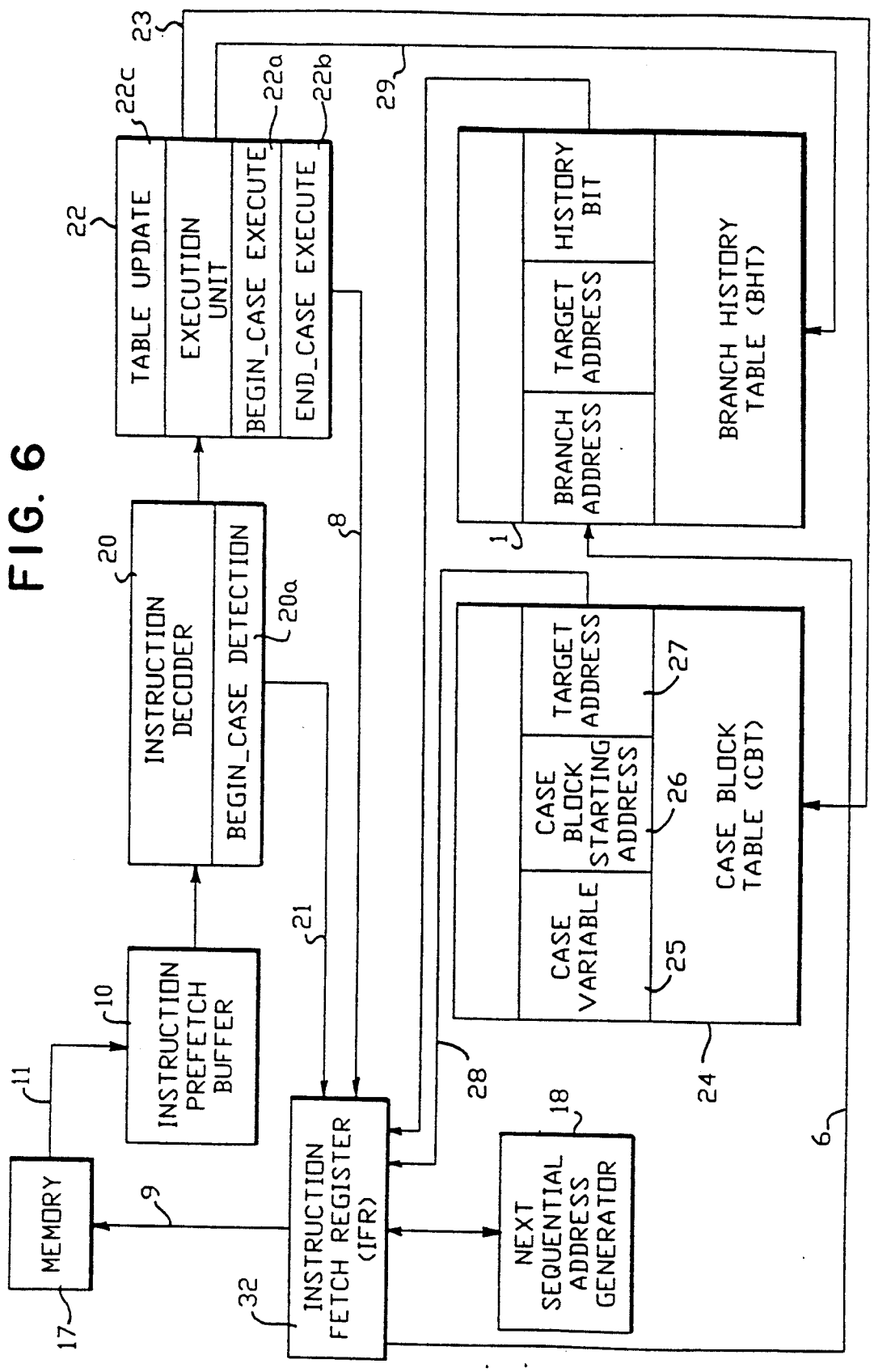
FIG. 6 is a block diagram illustrating how a Case Block Table can be combined with a Branch History Table.

FIG. 6 shows how the Case Block Table can be added to the design shown in FIG. 3, to predict the outcome of Case Block multi-way branches correctly. FIG. 7 shows how the new instructions, BEGIN_CASE and END_CASE, will be used by the compiler when compiling the example in FIG. 2. At the beginning of the entire Case Block, the BEGIN_CASE instruction has been added. The BEGIN_CASE instruction takes as its argument the Case Variable CV. Then the same code from the body of each subcase is copied from FIG. 2, with the exception that the exit from each subcase now uses the END_CASE instruction. Each END_CASE instruction takes as its argument the address 1100, which is the end of the Case Block.

For a match to occur in the CBT, both the Case Block starting address must match the CA field of an entry in the CBT and the Case Variable value must match the CV field. If a match occurs, then the target address (TA) field 27 is transmitted to the IFR 32 along path 28, to redirect prefetching from that target address. If no match occurs, then the CBT 24 is updated with a new entry, containing the Case Block starting address (CA) 25, the Case Variable value (CV) 26, and the target address (TA) 27. In the event that no match occurs in the CBT, the IFR 32 is redirected to prefetch a new path of instructions by execution unit 22 via path 8 after execution unit 22 has resolved the Case Block and determined the ultimate target address.

The CBT works as a Last-In-First-Out queue (LIFO). Replacements are made on a Least Recently Used basis. Other internal organization choices can also be made. CBT interrogation is performed with a fully associative search. During the execution of the Case Block, branches are not entered into the BHT 1. These would normally be done by execution unit 22, but until the execution unit encounters an END_CASE instruction (detected by block 22b), BHT updates on all branches are disabled. This should prevent any address matches from being made in the BHT 1 and effectively disables BHT predictions.

Disabling is accomplished by the execution unit 22. This further improves the processor pipeline performance by effectively disabling the BHT 1 while in a Case Block.

Referring still to FIG. 6, when tile instruction decoder unit 20 detects the BEGIN_CASE instruction (by way of block 20a), instruction prefetching is stopped via line 21. Then when the BEGIN_CASE enters the execution unit 22 (detected by block 22a), a search request is transmitted along 23 to the Case Block Table (CBT) 24, interrogating the CV 25 and CA 26 fields of the CBT. The contents of these two fields were described above in connection with the description of FIG. 4. Prefetching resumes on the execution of the END_CASE instruction. The execution unit 22 enables and disables the loading of IFR 32 from the next sequential address generator 18.

We will now go through the example presented previously, where the Case Block is entered with CV values of 2, 1 and then 2.

On first entering the Case Block with CV=2, there does not exist an entry in the CBT 28, so an entry into the CBT is made (by way of block 22c). The entry will have CA=100, CV=2, and TA=202. This update is transmitted via path 23. On the next invocation of the Case Block with the value of the Case Variable equal to 1 (CV=1), a lookup in the Case Block Table 24 is once again initiated by the execution unit 22 via path 23. A match is found on the CA field 26, but since no match is made on a corresponding CV=1 in the CV Field 25, a full match is not made. As a result, the execution unit will add another entry in the CBT 24 via path 23, containing the CA=100, the CV=1 and TA=102.

Finally, the Case Block is entered again, this time with CV=2 again. The CBT 24 is searched for a match on CA=100 and CV=2. A match is found in the CBT and the TA 27 address (TA=202) is transmitted via path 28 to the IFR 32 to redirect prefetching. The Case Block Table thus has successfully predicted the new stream of instructions to be fetched.

The Case Block Table records past execution history of the Case Block branch structure. The CBT also prevents the BHT from making incorrect branch predictions by disabling prediction of branches associated with a Case Block. Prediction of all branches is disabled until an END_CASE instruction is executed.

It should be noted that while this is the preferred embodiment of the subject invention, that there are many ways of implementing a Case Block Table. One alternative way of implementing a Case Block Table might be to combine a Branch History Table with a Case Block Table. The entire Case Block Table could share the same memory as the Branch History Table. A bit could be added to each entry to identify whether that entry is a BHT entry or a CBT entry.

Other changes could be made as well to the preferred embodiment by those skilled in the art, including: modifying the policy of disabling the BHT (the BHT could differentiate between a conditional anti unconditional branch and allow BHT predictions for unconditional branches); combining other branch prediction mechanisms with the CBT; and allowing the CBT to be accessed at instruction decode time (working in tandem with a Decode History Table). All of these changes, while they may result in better or poorer performance of the Case Block Table, do not depart from the basic idea of the invention. While the invention has been described in its preferred embodiment, it is to be understood that changes in form and details of the above-description may be made without departing from the true scope and spirit of the invention.

We claim:

1. An apparatus for predicting outcomes of blocks of conditional branch instructions having a common operand, comprising:

a look-up table including a plurality of entries, each of the entries having a first field for storing a starting address for a block of the conditional branch instructions, a second field for storing a previous value of the common operand for the block and a third field for storing a target address produced when the previous value was used to execute the block;

processor means, coupled to the look-up table, the processor means including:

(a) means for detecting that one of the blocks is to be processed and for determining the starting address of the one of the blocks;

(b) means for determining a current value of the common operand;

(c) means for determining whether the look-up table contains a corresponding entry wherein the starting address of the one of the blocks matches data in the first field and the current value of the common operand matches the previous value of the common operand;

(d) means, responsive to a determination that there is a corresponding entry, for prefetching an instruction at the target address stored in the third field of the corresponding entry prior to fetching of any of said conditional branches in the one of the blocks.

2. The apparatus of claim 1 further comprising a branch history table coupled to the processing means.

3. The apparatus of claim 1, further comprising:

means responsive to a determination that said look-up table does not contain a corresponding entry for executing said one of the blocks using said current value of the common operand.

4. The apparatus of claim 3, further comprising:

means responsive to execution of said one of the blocks for creating a new entry in said table, said new entry recording the target address which was produced by said execution of said one of the blocks using said current value.

5. The apparatus of claim 2, further comprising:

means for detecting the end of said block; and means responsive to said means for detecting for enabling said branch history table to redirect instruction fetching in place of said entries in said look-up table.

6. The apparatus of claim 1 further comprising means, responsive to said means for detecting, for inhibiting the processing means from using the branch history table.

7. An apparatus for predicting outcomes of blocks of conditional branch instructions having a common operand, comprising:

a look-up table including a plurality of entries, each of the entries having a first field for storing a starting address for a block of the conditional branch instructions, a second field for storing a previous value of the common operand for the block and a third field for storing a target address produced when the previous value was used to execute the block;

a processor, coupled to the look-up table, the processor including:

(a) a decoder, the decoder including instruction detection means for detecting an instruction indicative that one of the blocks is to be processed;

(b) instruction execution means, coupled to the decoder, for determining the starting address of the one of the blocks and a current value of the common operand and for determining whether the look-up table contains a corresponding entry wherein the starting address of the one of the blocks matches data in the first field and the current value of the common operand matches the previous value of the common operand;

(c) instruction fetch means, responsive to a determination that there is a corresponding entry, for prefetching an instruction at the target address stored in the third field of the corresponding entry prior to fetching of any said conditional branches in the one of the blocks.

* * * * *